May 21, 1968   J. O. NELSON   3,383,925

HIGH PRESSURE GAUGE HOUSING

Filed Aug. 30, 1965

INVENTOR.
JORD O. NELSON

BY *Souther, Stoltenberg & Bass*

ATTORNEYS 3,383,925
HIGH PRESSURE GAUGE HOUSING
Jord O. Nelson, Paramont, Calif., assignor to Eltra
Corporation, Toledo, Ohio
Filed Aug. 30, 1965, Ser. No. 483,571
6 Claims. (Cl. 73—431)

ABSTRACT OF THE DISCLOSURE

A protective housing for a pressure indicating means with a drum type movable indicia bearing member, positioned in an inverted cup-shaped housing horizontally disposed, having an inner transparent cup-shaped sealing portion cooperating with the indicia bearing member to allow the indicia to be made visible to an operator through a sight aperture in the outer housing, the outer housing having a central aperture in its upper wall closed by a frangible sealing element to release excessive pressure in the event a rupture occurs in the pressure indicating means.

---

Figure 1:
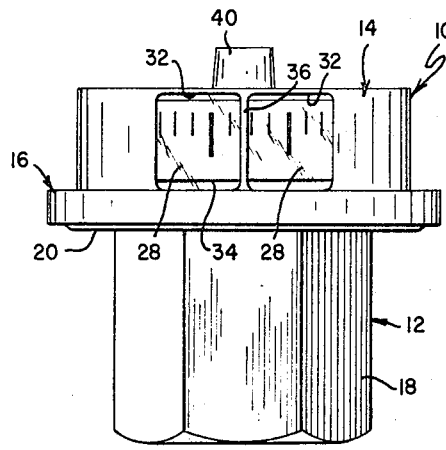

This invention relates to pressure gauges and particularly to high pressure gauges of the general type known as mud and cement high pressure gauges. More particularly, it relates to housings for such gauges.

Gauges of this type are intended to be used in connection with fluid circulating systems of earth boring equipment such as that used in the oil well drilling industry. The primary purpose of the circulating system is to circulate a mud-like fluid through and around rotary drill bits during the drilling operation. Gauges presently available for this purpose are not completely satisfactory for several reasons. One problem is that they are considerably hard to read because of the rapid wide range oscillations of the pressure indicator. Another is that they are not provided with safety means to prevent explosion of the gauge housing should the pressure responsive mechanism such as a Bourdon tube, bellows, or connections thereto, accidentally develop leaks. Also, because gauges of this type are used in areas where they are subject to being splashed or sprayed with the mud-like fluid, it is frequently necessary that an operator use a cloth or the like to clean the lens of the instrument before being able to read the indicator. Other disadvantages are their large bulky size; they are not easily or economically repaired, and they are more costly.

It is, therefore, a principal object of this invention to provide an improved construction for a high pressure gauge of the type intended for use with fluid circulating systems of earth boring equipment.

It is another object of this invention to provide a gauge construction wherein means are provided to stabilize the pressure indicating means so as to be free of oscillations and thereby more easily read by an operator.

It is another object of this invention to provide a gauge construction for the purpose intended which will include safety means in the housing construction to prevent damage to the instrument, and/or possible explosion of the housing which might result in injury to anyone in the vicinity of the housing.

Another object of this invention is to provide an improved lens and housing assembly to facilitate visual determination of a pressure indicator within the instrument during adverse conditions.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Figure 3:
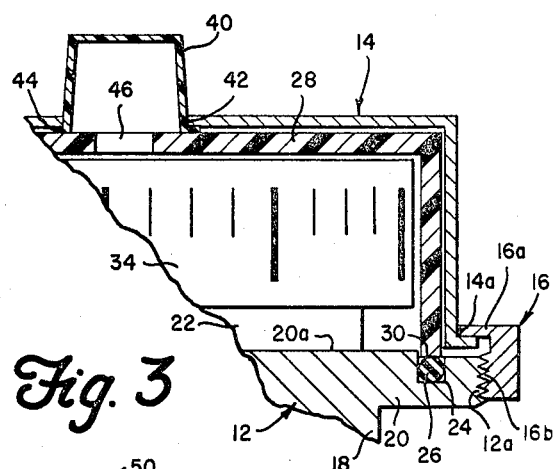
Figure 5:
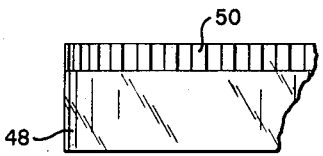
Figure 2:
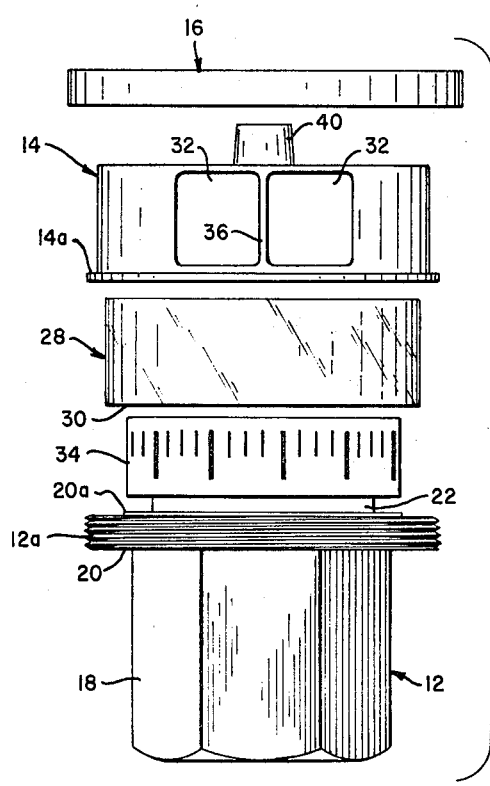
Figure 4:
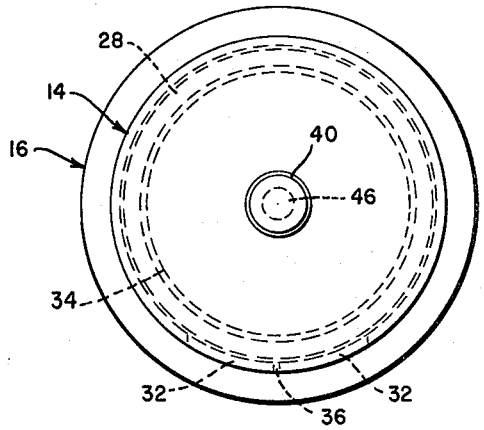

Referring to the drawings:

FIG. 1 is a side elevational view of a high pressure gauge showing viewing windows through which a visual reading may be taken, FIG. 2 is an exploded view showing the main components of the gauge that this invention is concerned with, FIG. 3 is an enlarged sectional view of a portion of the gauge, FIG. 4 is a top plan view of the gauge, and FIG. 5 is a partial elevational view of an alternate form of one component of the gauge.

In the drawings, particularly FIG. 1, an assembled high pressure gauge 10 is shown comprising a base or mounting member 12, an inverted cup-shaped housing member 14, positioned on top of the base member, and an assembly ring 16. The assembly ring (FIGS. 2 and 3) is provided with an inwardly projecting annular flange 16a and an inner threaded portion 16b. The flange 16a engages an outwardly projecting annular flange 14a of the housing and the threaded portion 16b engages a threaded portion 12a, formed in the peripheral edge of the base member to maintain the housing and the base member in assembled relation.

The base 12 includes a lower coupling section 18 which is integral with an upper plate portion 20 the peripheral edge of which has the threads 12a formed therein. The coupling section 20 has an inner threaded bore (not shown) which when properly connected to a stand pipe or the like provides a means of communication between a circulating system and a pressure responsive mechanism 22 of the gauge. Only a portion of the mechanism 22 is shown which is suitably mounted to the plate 20. Since the pressure responsive mechanism forms no part of this invention it will not be described further in detail. The plate 20 is also provided with an annular groove 24 which is formed in its planar surface 20a to accommodate a conventional sealing O ring 26. The planar surface 20a is raised about $\frac{1}{16}''$ to provide a circular guide for the transparent cover member 28, such that relative rotation therebetween is facilitated.

Included in the construction is an inverted cup-shaped transparent cover member 28 which is positioned so that a lower annular edge 30 of the member is in cooperating relation with the sealing O ring 26. The outside diameter of the transparent member is dimensioned to cooperate closely with the inside diameter of the housing member 14. When the instrument is in assembled relation the member 28 provides lenses for openings 32 in an annular wall of the housing 14 through which an indicating member 34 may be seen (FIG. 1). In addition to serving as a lens for the instrument, the member 28 and the O ring 26 provides a sealed inclosure for the instrument, the purpose of which will be better understood hereinafter.

The indicating member 34 has a drum type configuration and is provided with suitable indicia on its outer annular surface. Since the invention is adaptable to gauges of various pressure ranges, given number values were omitted from the disclosure to prevent limitation thereto. Means for determining a pressure reading with relation to a given rotary position of the indicator is provided by a stationary pointer 36. The pointer 36 is a relatively narrow vertical bar which separates the openings 32 and is an integral portion of the housing 14.

An important feature of this invention is the horizontal positioning of the pressure indicating means 34. In prior gauges constructed for use intended herein, an indicating pointer was positioned to operate in an arc in a vertical plane. This type of operation has not been satisfactory because of the rapid and wide range oscillations of the pointer, at times so great that a pressure reading was almost impossible. As is well known to those experienced in the art, the oscillations are a result of pulsations in the system which in fact are pressure variations created by the inconsistency of the mud-like fluid pumped through the system. Oscillations can also be caused by vibrations that are transmitted to the gauge from operating machinery of the earth boring equipment.

In both laboratory and field tests, it has been found that these oscillations can be eliminated by operating a drum-type indicator in a horizontal plane. It is believed that gravitational forces tend to draw the bulky configuration of the drum downwardly thus tending to damp the pulsation activity of the pressure responsive mechanism. Additional damping is provided by the use of a special formulated fluid in the instrument having high adhesion qualities with a minimum temperature expansion factor, hence the O ring seal at edge 30 of the transparent member. The use of damping fluid in certain instruments is not new in the art, but to my knowledge, it has not been used in high pressure gauges of the type disclosed herein.

In gauges intended for the use disclosed herein, leaks occasionally develop in the pressure responsive mechanism as a result of the pulsation and the relatively high pressures involved. In some operations, these pressures are as high as 15,000 to 20,000 p.s.i. To prevent damage to the instrument and possible injury to anyone in the vicinity of the instrument, should it explode, an expendable pressure release means is included which projects from the top of the housing member 14. The release means is a relatively thin plastic thimble-like member 40 which projects through an opening 42 centrally located in the top surface of the housing. The member 40 is formed with an outwardly projecting annular flange 44 which when the instrument is in assembled relation, is in sealing engagement with the top surface of the transparent member 28. An opening 46 is provided in the transparent member directly under the pressure release member thus providing a sealed passage between the pressure release member and the interior of the instrument. It should be obvious that if a substantial increase in pressure occurs within the gauge, the relatively thin member 40 will break before more serious damage is caused. An important safety feature of this arrangement is that if a high pressure condition did exist, sufficient to cause the release member to break, the force would be upward in such a direction that a viewer would unlikely be in its path.

The assembled relation of the base member 12, the transparent member 28, and the housing member 14 provides an additional advantage in that it is possible to rotate the transparent member to present clean lens portions in the openings 32 of the housing should the gauge become covered with the mud-like fluid. This is accomplished by first loosening the ring 16 slightly, then using one or two fingers apply pressure to the outer surface of the member 28 through the openings 32 and urge the member 28 to one side or the other, far enough to expose clean lens areas. In this operation, it is possible to lose a small amount of the damping liquid within the gauge, but not enough during any single operation to affect the damping action of the remaining liquid. After several such operations, it may be necessary to refill the instrument with damping fluid but this can easily be done in the field by an operator.

In FIG. 5, an alternate form 48 is shown of a transparent cover member which has substantially the same overall configuration as the member 28, except that it is provided with a suitable roughened surface in a portion 50 of its outer annular surface to facilitate manual rotation of the member for the purpose described hereinbefore. In the drawing, this is shown as being serrations or grooves; however, any form of roughened surface in this general area would be suitable for the purpose intended.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a high pressure gauge construction a base member, a housing member, an assembly ring in engagement with said base member and said housing member, a seal means disposed on the upper surface of said base member, a mounting means in the lower end of said base member, a transparent cover member within said housing, an annular edge of said cover member in sealing engagement with said seal means, a pressure release means projecting upwardly from the top surface of said housing member and in communication with the interior of said transparent cover member, said housing member provided with an annular wall, openings in said annular wall exposing portions of said transparent cover member, a stationary pointer integral with said housing member and adjacent said openings, and a rotatable pressure indicating means horizontally disposed within said housing and visible through said openings and said transparent cover member.

2. In a high pressure gauge construction as in claim 1 wherein said pressure release means is an expendable replaceable member.

3. In a high pressure gauge construction as in claim 1 wherein said pressure release means is formed of a non-metallic material.

4. In a high pressure gauge construction as in claim 1 wherein said transparent cover member forms a lens for said gauge.

5. In a high pressure gauge construction as in claim 1 wherein said transparent cover member is manually rotatable to provide a plurality of lens portions for said openings.

6. In a high pressure gauge construction as in claim 1 wherein said transparent cover member is provided with a roughened area in a portion of its outer annular surface to facilitate manual rotation of said member.

References Cited
UNITED STATES PATENTS

| | | | |
|---|---|---|---|
| 1,905,415 | 4/1933 | Lemel. | |
| 2,000,092 | 5/1935 | Norwood | 73—363.7 X |
| 2,563,732 | 8/1951 | Mather | 73—416 X |
| 2,833,149 | 5/1958 | Aldridge et al. | 73—352 |
| 3,177,722 | 4/1965 | Huston | 73—416 X |
| 3,209,599 | 10/1965 | Harland et al. | 73—431 |

LOUIS R. PRINCE, *Primary Examiner.*

DANIEL M. YASICH, *Assistant Examiner.*